(12) United States Patent
Carrington et al.

(10) Patent No.: US 7,050,715 B1
(45) Date of Patent: May 23, 2006

(54) FORENSIC VISUALIZATION AND RECORDING APPARATUS

(76) Inventors: John H. Carrington, 2316 Wakefield Plantation Rd., Raleigh, NC (US) 27614; David W. Harvey, 1450 Long Mill Rd., Youngsville, NC (US) 27596

( * ) Notice: Subject to any disclaimer, the term of this patent is extended or adjusted under 35 U.S.C. 154(b) by 130 days.

(21) Appl. No.: 10/895,691

(22) Filed: Jul. 22, 2004

(51) Int. Cl.
  *G03B 15/03* (2006.01)
  *G03B 17/00* (2006.01)
(52) U.S. Cl. ...................... 396/182; 396/428
(58) Field of Classification Search ............ 396/15, 396/155, 182, 419, 428
  See application file for complete search history.

(56) References Cited

U.S. PATENT DOCUMENTS

| | | | | |
|---|---|---|---|---|
| 2,433,133 A | * | 12/1947 | Lindsey | 355/21 |
| 2,652,220 A | * | 9/1953 | Nocht | 248/122.1 |
| 3,228,283 A | * | 1/1966 | Fulton et al. | 396/428 |
| 3,608,462 A | * | 9/1971 | Groshong | 108/20 |
| 4,060,819 A | * | 11/1977 | Bahnsen | 396/419 |
| 6,969,033 B1 | * | 11/2005 | van der Linden | 248/177.1 |

* cited by examiner

*Primary Examiner*—W. B. Perkey
(74) *Attorney, Agent, or Firm*—Mills Law Firm PLLC (57) ABSTRACT

An integrated imager and camera mounting assembly that allows a single operator to scan the crime scene for prints without assistance, and to attain an optimally illuminated and stably focused recorded image with single handed adjustments. The assembly includes an A-frame stand which carries a pair of UV lights on adjustable arms for single handled adjustment by the operator in the scanning and recording modes. The stand includes a footed base that allows the operator to securely engage the frame against vertical, horizontal and irregular surfaces using the imager handle thereby locating the imager at a fixed distance from the print area and permitting ready focusing of the image with the other hand. The base further includes a sliding scale for placement in the field of view for dimensional referencing.

12 Claims, 7 Drawing Sheets

FORENSIC VISUALIZATION AND RECORDING APPARATUS

FIELD OF THE INVENTION

The present invention relates to forensic apparatus and, in particular, an integrated forensic imager and stabilizer mount for visualization and recording evidentiary material such as fingerprints.

BACKGROUND OF THE INVENTION

The investigation at crime scenes is assisted by the thorough investigation for trace evidence not readily visible by the investigator. Lighting conditions vary considerably, both indoors and outdoors ranging from bright daylight to darkness. To permit the identification of probative evidence under such conditions, devices and techniques have been developed to highlight and record potentially important trace evidence, such as fingerprints, body fluids, and blood. After location and identification, the recording of the evidence may be enhanced by highlighting using applied materials and lighting techniques.

The potential for probative evidence may not always be readily visually assessed. To enable a rapid evaluation of a scene, visualization systems, such as the Krimesite Imager from Sirche Fingerprint Laboratories, have been developed whereby the scene can be visually scanned under ultraviolet illumination which highlights potential print areas as viewed through the imager. Thereafter, the areas of interest are digitally or photographically recorded by a camera mounted on the imager. Generally, two persons are required, one to direct the UV illumination about the scene and another using the imager to identify areas of interest. Inasmuch as the prints may be located on a variety of surfaces, horizontal or vertical or inclined, a stable mounting platform is required for the camera, typically a tripod or quadpod having adjustable telescopic legs requiring the operator to use both hands for adjustment, preliminary visualization and focusing, and subsequent iterations until satisfactory positioning was achieved. Concurrently, the lights are adjusted for proper illumination. To provide dimensional reference on the print for analytical use on auxiliary equipment with photographic software, a scale is inserted into the field of view, and oftentimes taped to prevent movement. Thereafter, if all components were properly oriented, the print is recorded. If not readjustments are made. While widely regarded as a significant advance, it has been desired to reduce further the labor and time required for the scanning and recording processes.

BRIEF SUMMARY OF THE INVENTION

The present invention provides an integrated imager and camera mounting assembly that allows a single operator to scan the crime scene for prints without assistance, and to attain a stable focused and recorded image of select areas with single handed adjustments. The foregoing is achieved by an A-frame stand to which the imager is attached and which permits scanning without obstruction therefrom. The stand carries a pair of UV lights on adjustable arms for single handed adjustment by the operator in the scanning and recording modes, thereby eliminating the need for supplemental lamps and attendant personnel. The stand includes a footed base that allows the operator to securely engage the frame against vertical, horizontal and irregular surfaces using the imager handle thereby locating the imager at a fixed distance from the print area and permitting ready camera adjustments with the other hand. The base further includes a sliding scale that may be placed in the field of view for scaling of the recorded image. Resultantly, the operator may, without assistance or auxiliary equipment, scan and record scalable images of probative prints from the scene.

Accordingly, it is an object of the invention to provide forensic visualization and recording apparatus operable without auxiliary equipment or personnel.

Another object of the invention is to provide an integrated mounting platform for a forensic imager that permits stable orientation and recording on varying evidentiary surfaces.

A further object of the invention is to provide a forensic image recording apparatus that permits adjustment of illumination and camera setting with one hand while maintaining a stable camera orientation with the other hand.

DESCRIPTION OF THE DRAWINGS

The above and other features and advantages of the invention will become apparent upon reading the following detailed description taken in conjunction with the accompanying drawings in which.

DETAILED DESCRIPTION OF THE PREFERRED EMBODIMENTS

Figure 1:
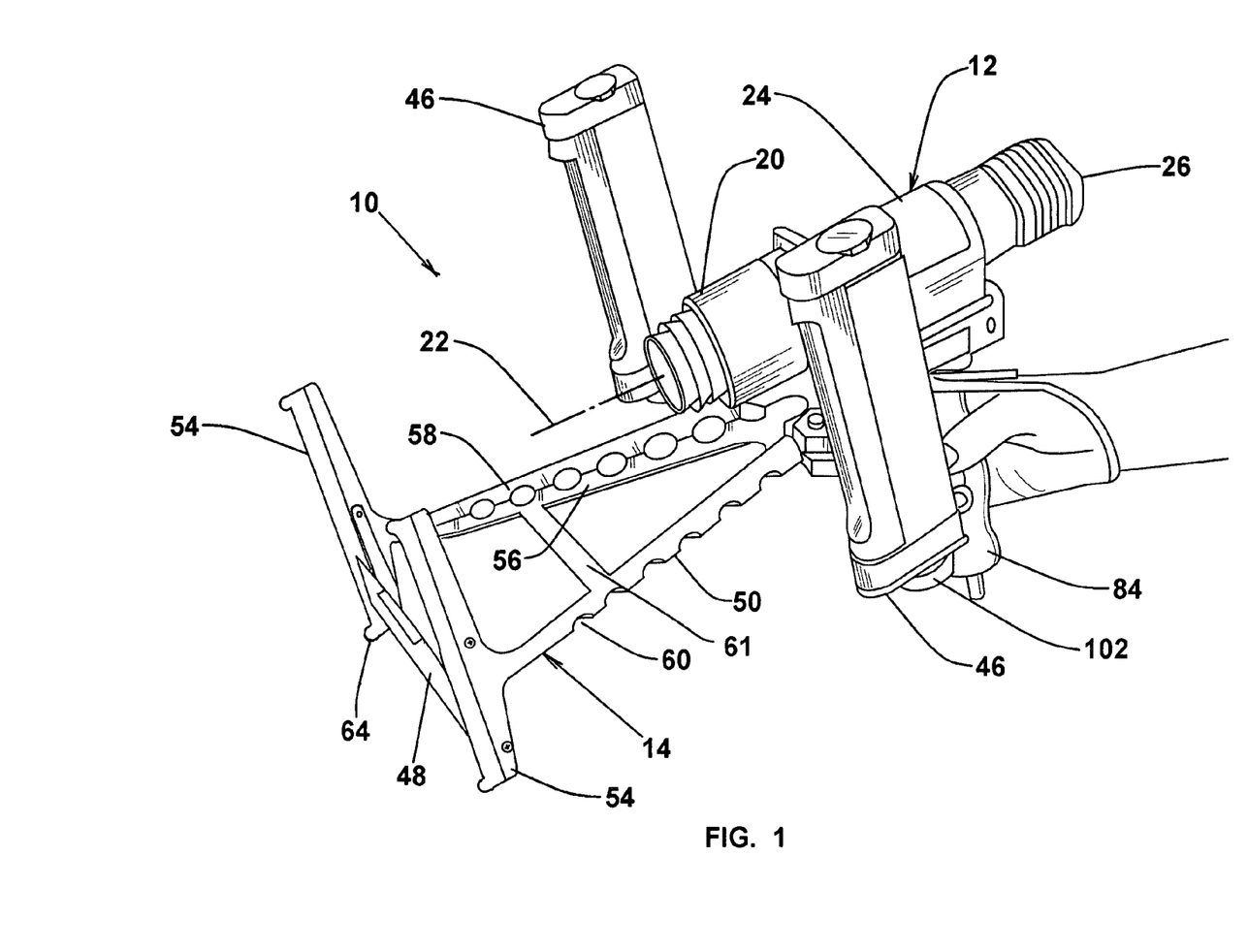
FIG. 1 is a front perspective view of forensic visualization and recording apparatus provided with a stabilizer mount according to an embodiment of the invention with the imager carrying an eyepiece for operating visualization.
Figure 2:
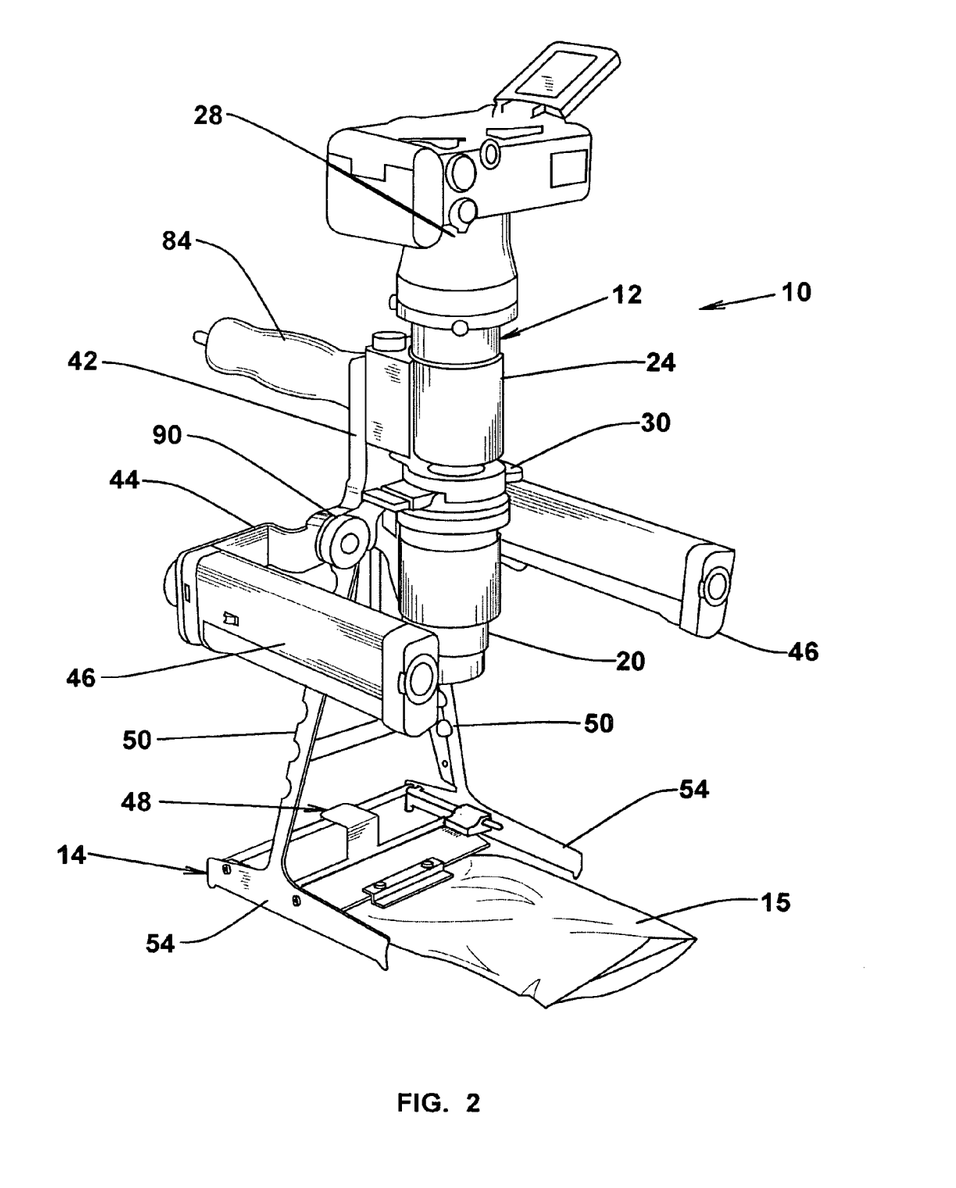
FIG. 2 is a side perspective view of the forensic view and recording apparatus of FIG. 1 with the imager carrying a camera for recording a fingerprint on an evidentiary material.
Figure 4:
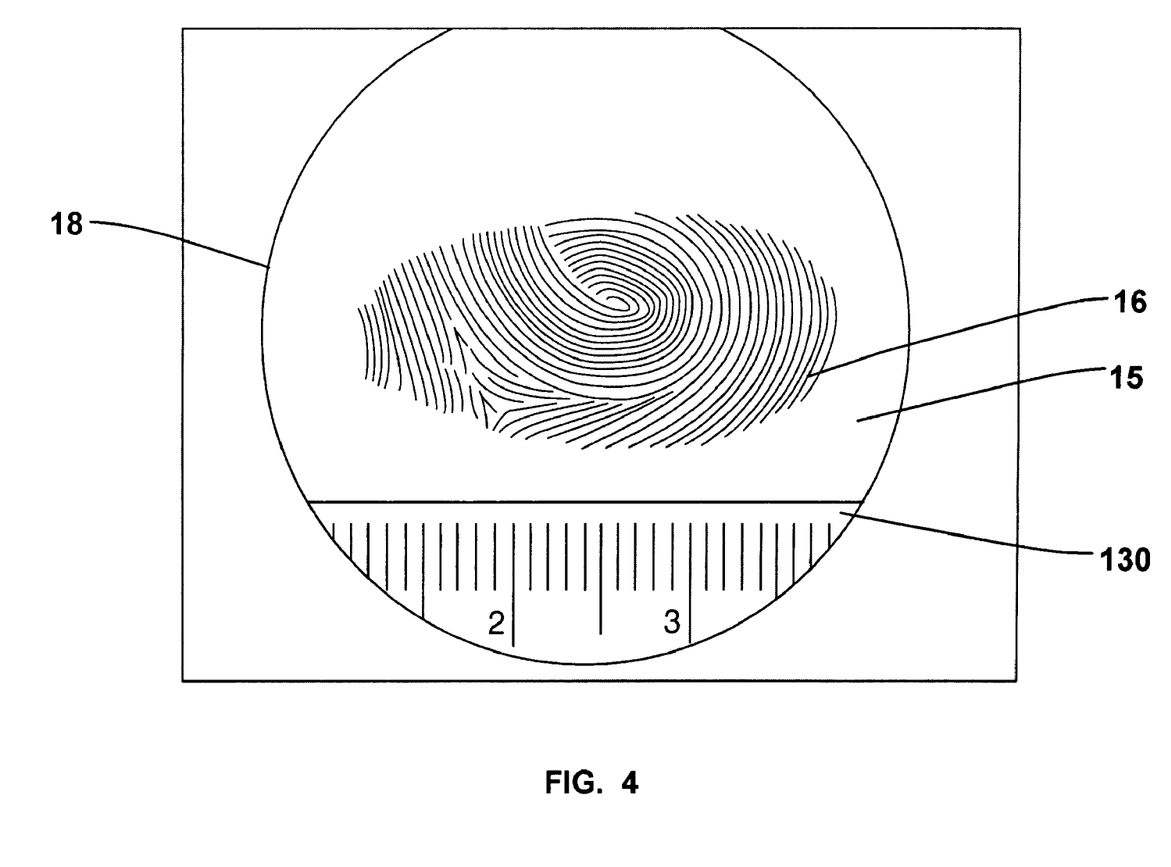
FIG. 4 is an illustrative view of the image field showing the fingerprint on the evidentiary material.

Referring to the drawings, FIGS. 1 and 2 show a forensic visualization and recording apparatus 10 for the visual scanning of an evidence site for trace evidence and the photographic recording of selected areas. The apparatus 10 comprises a forensic imager 12 coupled to a stabilizer mount 14. As described below the stabilizer mount 14 is releasably carried on the imager 12 and permits unobstructed visualization of the crime scene in a scanning mode (FIG. 1) and a secure positioning in a recording mode (FIG. 2) over a selected area of evidentiary material 15 having a detected print 16 in a field of view 18 as shown in FIG. 4.

The imager 12 utilizes reflective ultraviolet imaging technology, know as RUVIS, to locate latent fingerprints that are invisible to the naked eye, on most non-porous surfaces, without the prior use of powders, chemicals or vapor treatments of any kind. Unlike other types of alternate light sources and lasers, such imagers are not affected by ambient light and can be used in a broad range of environments, including daylight or total darkness, indoors or out doors. A suitable commercially available imager is the Krimesite Imager available from Sirchie Finger Print Laboratories of Youngsville, N.C., assignee of the present invention.

The imager 12 selectively amplifies 254 nm shortwave ultraviolet light and ignores all other wavelengths. The ultraviolet light is reflected off the residues left behind from a finger print. The imager 12 receives the reflected light through a front lens assembly 20 having an optical axis 22 that focuses the image to an internal high gain intensifier in the imager housing 24. The light is then amplified several thousand times and converted into visible light providing a visible image of the untreated print at either an eyepiece 26 (FIG. 1) for operator visualization or at a recording film or digital camera 28 (FIG. 2) for real time image capture for permanent records of untreated prints. A sliding detented filter slide 30 is carried at the rear of the lens assembly 20. The filter 30 has a first position interposing a clear filter in the light path for visible and Luminol visualization and a second position interposing an ultraviolet filter for RUVIS visualization.

Figure 5:
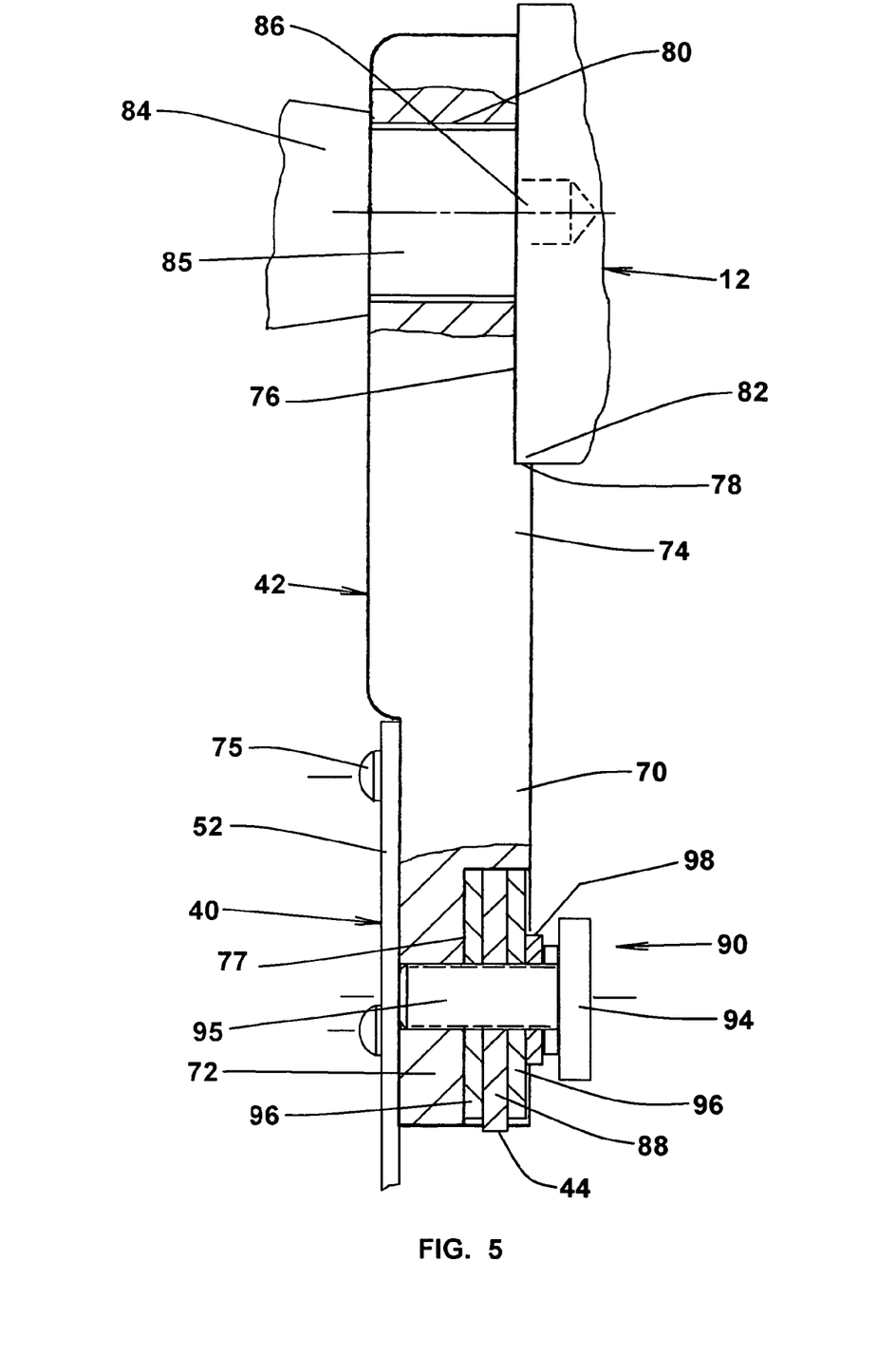
FIG. 5 is an enlarged partially sectioned side view of the forensic visualization and recording apparatus of FIG. 1 showing the mounting of the imager on the support plate and the pivotal connection for the lamp bracket.
Figure 6:
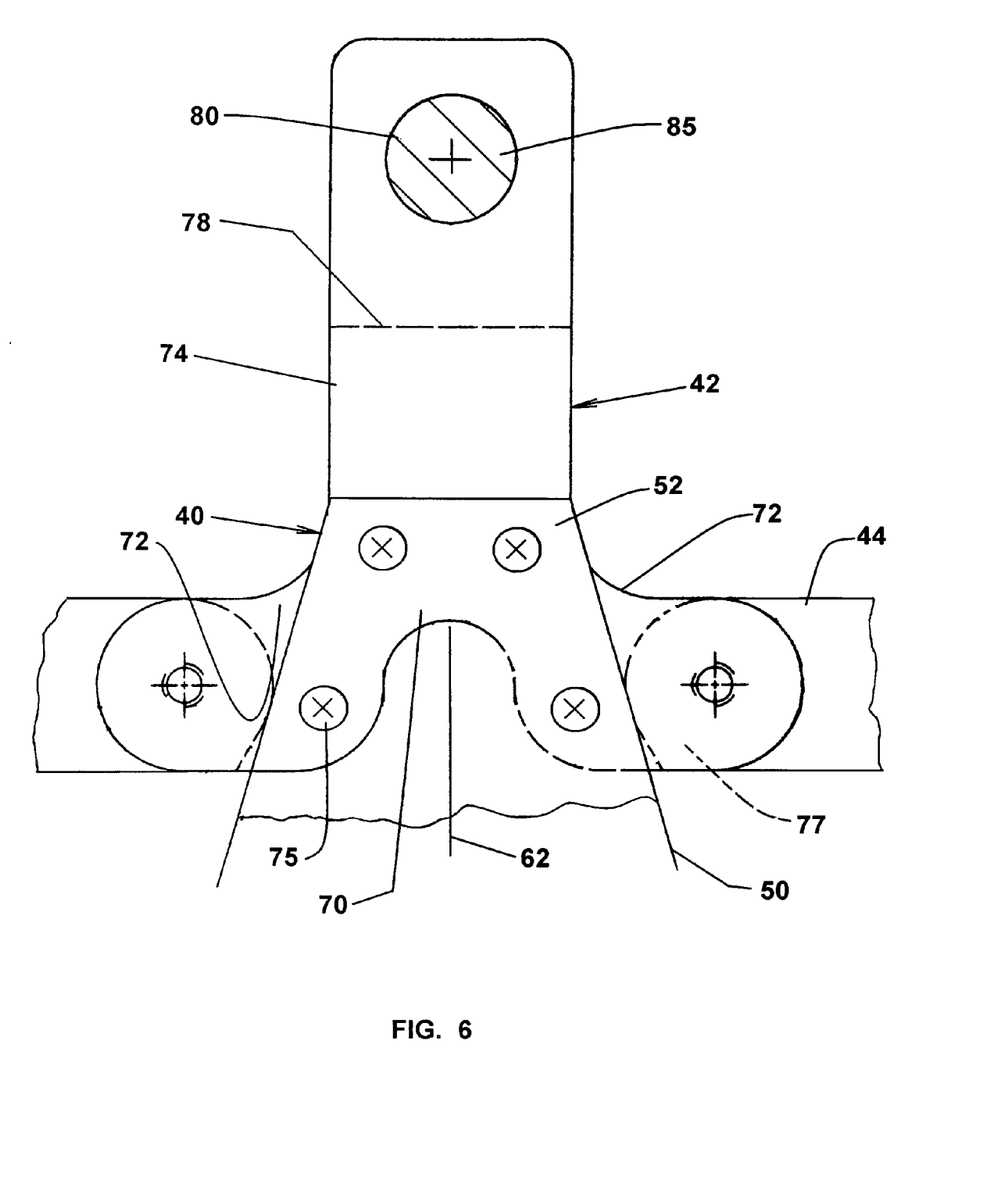
FIG. 6 is an enlarged rear view of the upper end of the stabilizer mount.

The stabilizer mount 14 comprises an A-frame support stand 40, an imager mounting plate 42 having a pair of laterally extending pivotal brackets 44 carrying frontally projecting lamp units 46 and a scale slide assembly 48 providing dimensional reference in the recording mode. The stand 40 is a unitary structure formed of 13 ga. cold rolled steel and coated with a black wrinkle paint. The stand 40 includes a pair of upwardly inclined legs 50 converging at a generally triangular top section 52 as shown in FIGS. 5 and 6. Each leg 50 terminates at a lower end with a transverse foot 54. The legs 50 have an L-shaped cross section including a base section 56 outwardly terminating with a forwardly turned flange 58. Prior to forming the flanges 58, the planar stock for the stand is provided with a vertical series of circular holes 60 serving to reduce the carrying weight of the stand without a loss of operative strength. The legs 50 at flanges span an acute angle of about 30° symmetrical with a vertical plane 62 (FIG. 6) coincident, in assembly, with the focal axis 22 of the imager 12. The feet 54 extend forwardly and rearwardly of the legs, and are inwardly turned at the bases thereof at a shallow angle of about 30°. Downwardly projecting tabs 64 are formed at the lower ends of the feet 54 and have lower surfaces lying in a common plane orthogonal to the plane 62, thereby allowing the stand to be engaged against a planar surface, horizontal, vertical or inclined, for recording located prints as described below, as well as a stable three point engagement for irregular surfaces. While the scale assembly 48 provides lateral and torsional strength, a cross member 61 or other reinforcing means may be provided between the legs.

Referring to FIGS. 5 and 6, the mounting plate 42 is a unitary member formed of a light weight material such as black anodized aluminum. The mounting plate 42 includes a base 70 having outwardly extending wing sections 72 and a central upwardly extending head section 74. The rear surface of the base 70 is connected to the front surface of the top section 52 by a plurality of threaded fasteners 75.

The outer ends of wing sections 72 terminate with circular recessed bearing pads 77 having threaded bores. The front surface of the head section 74 includes a recessed top mounting surface 76 (FIG. 5) having a lower horizontal locating surface 78 and a central mounting hole 80. In assembly, the imager 12 is positioned on the mounting plate 42 with a front end portion 82 engaging the locating surface 78 and the base of the imager engaging the mounting surface 76. The imager 12 is provided with a removable handle 84 having a shaft 85 that is inserted through the mounting hole 80 and a shank 86 that is threaded into the imager base to securely mount the imager on the stand at a fixed distance and with the focal axis normal to the engagement surface.

The brackets 44 are generally L-shaped and include apertured semicircular inner ends 88 engaging the pads 77 and connected thereat by controlled resistance pivotal connections 90. As shown in FIG. 5, the pivotal connections 90 each include threaded fastening means, such as an adjusting screw 94, having a threaded shank 95 extending through the inner end 88 and threaded into the bore in the pad 77, circular washers 96 engaging opposed surfaces of the inner end 88 and a compressible annular gasket 98 between the outer washer and the base of the adjusting screw 94. In assembly, the screw 94 is tightened sufficiently such that the washers 96 and gasket 98 provide controlled frictional resistance at the brackets to maintain desired angularity while accommodating manual movement to moved positions without loosening the connection thereby enabling single handed adjustment of the position of the lamp brackets 44. Permanent assembly of the bracket is provided by torquing the screw 94 sufficiently to resist unloosening during bracket movement.

Figure 3:
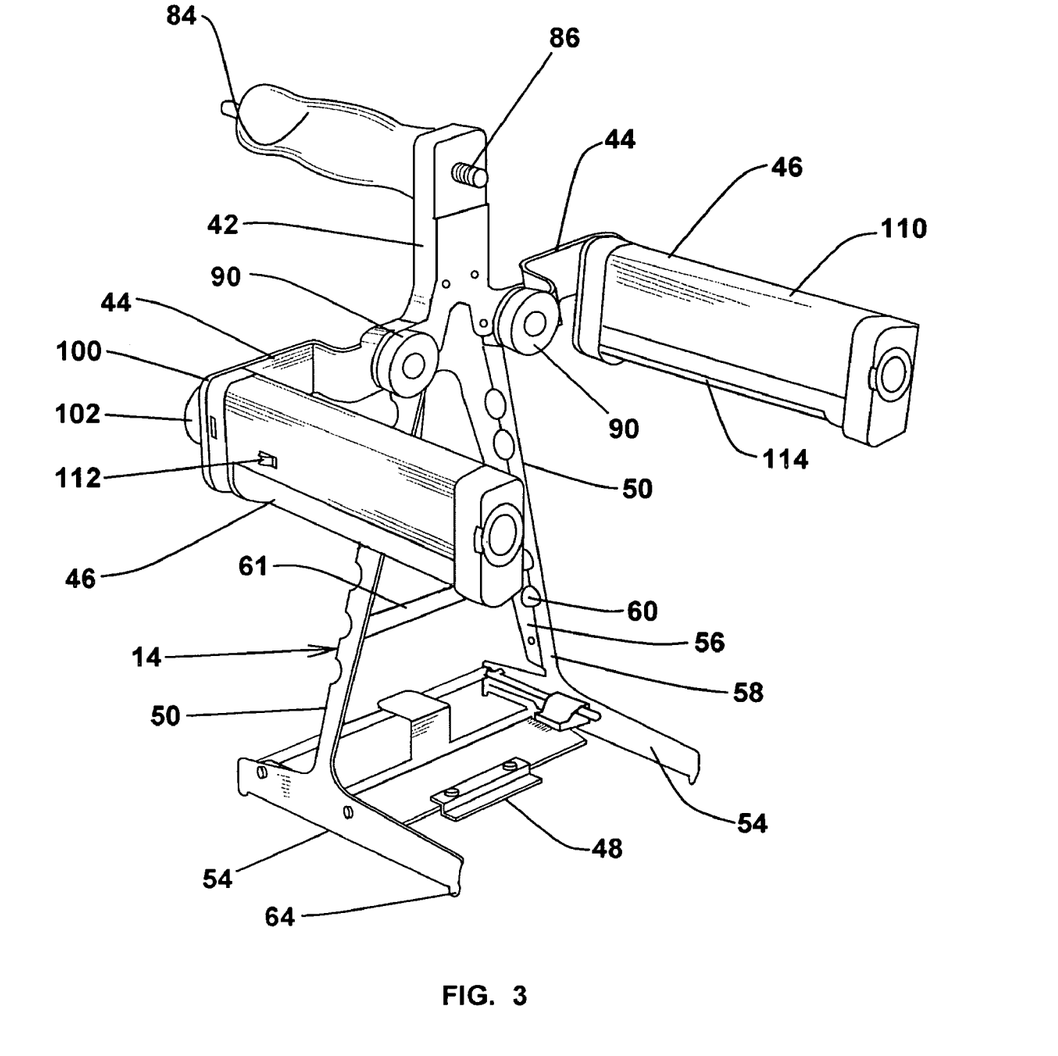
FIG. 3 is a front perspective view of the stabilizer mount, with the imager removed.

Referring to FIG. 3, the brackets 44 include a transverse center section and outer ends terminating with a generally L-shaped apertured mounting pads 100 to which the base ends of the lamp units 46 are removably attached by threaded mounting knobs 102. The lamps 46 are an ultraviolet light source, at peak wavelength of about 254 nm, for illuminating longwave invisible fingerprints. The lamps 46 include a housing 110 containing a power supply energized by switch 112 for illuminating an elongated UV light source 114. A suitable commercially available lamp is the UV Mini Light Source, available as catalog no. CUV100TS from Sirche Fingerprint Laboratories of Youngsville, N.C.

Figure 7:
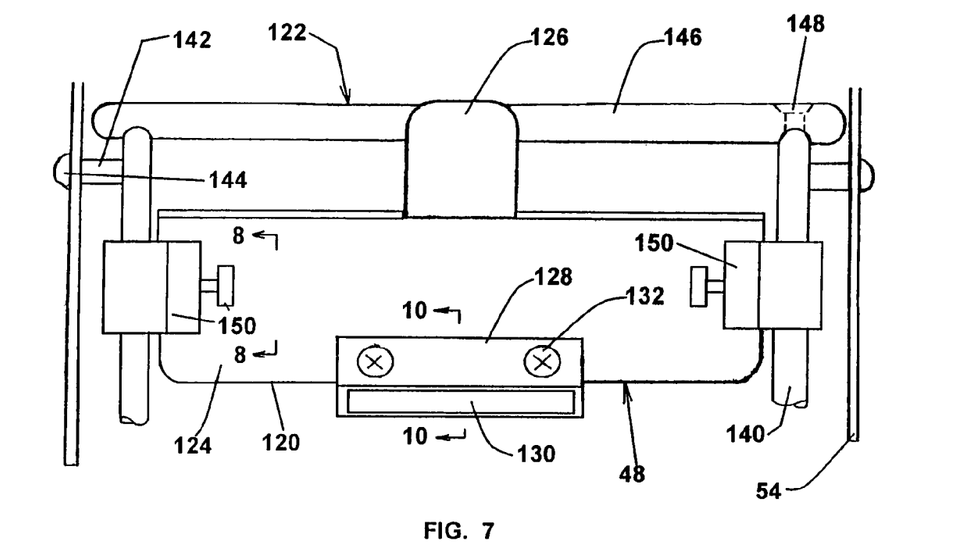
FIG. 7 is an enlarged top view illustrating the scale slide assembly for the stabilizer mount.
Figure 8:
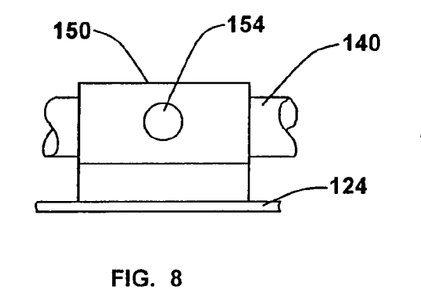
FIG. 8 is a view taken along line 8—8 of FIG. 7 showing the bearing block for the scale slide assembly.
Figure 9:
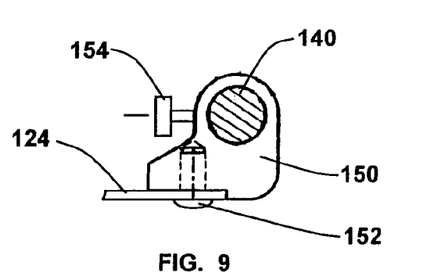
FIG. 9 is a view taken along line 9—9 of FIG. 8 showing the mounting of the bearing block on the slide plate of the scale slide assembly.
Figure 10:
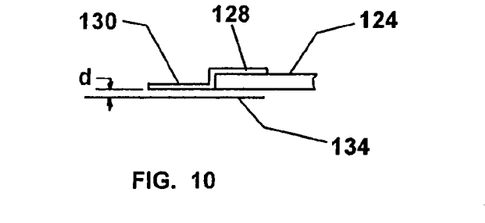
FIG. 10 is a view taken along line 10—10 in FIG. 7 showing the clearance of the scale slide assembly with respect to an evidentiary surface.

Referring to FIGS. 7 through 9, the slide assembly 48 provides a scaled indicia that may be moved into the recorded field in the recording mode to permit scaling of the print information for analytical use on auxiliary equipment, and rearwardly shifted outside the field of view in the scanning mode. The slide 48 comprises a slide plate 120 supported on a slide assembly 122 for manual sliding movement between a forward extended position and a rearward retracted position. The slide plate 120 includes a rectangular base plate 124 having an upwardly and rearwardly extending handle 126. A scale member 128 having linearly scaled indicia 130 on the top surface thereof is attached to the front of the slide plate 120 by fasteners 132. As shown in FIG. 10, the scale member 128 is formed of thin shim stock and positioned to have a minimal clearance "d" with the stand engagement surface 134 thereby placing the indicia in substantially the same narrow focal plane as the print image to be recorded (FIG. 4). Preferably, a clearance "d" of about 1/32 inch is desired thereby placing the indicia in the focal plane of the image for use in conjunction with photograph processing programs.

The slide assembly 122 includes a laterally spaced pair of cylindrical slide bars 140 connected to the legs 54 at cylindrical spacers 142 by fasteners 144, and interconnected at rear ends by cross bar 146 at fasteners 148. The plate 124 is supported on the slide bars 140 at transverse passage in slide blocks 150 and attached to the plate 124 by fasteners 152. A thumb screw 154 on each of the blocks 150 may be manually tightened to lock the plate in a desired position.

In use in investigating a crime scene, the operator deploys the apparatus in the scanning mode shown in FIG. 1 with the slide 120 in the retracted position outside the field of view. The brackets 44 are adjusted to project the UV light of the lamps 46 forwardly for detecting evidentiary areas of interest, visualization through the imager 12 with the eyepiece 26. Upon detection, the areas containing prints or other evidentiary material of interest are tagged and labeled for recording. After completing the scanning, the operator mounts the camera 28 to the eyepiece 26. The operator then positions the stand 14 with one hand at the imager handle to support the apparatus against the evidence surface over the detected area, and using the other hand, adjusts the camera settings to focus on the print adjusting the stand position as required; adjusts the positions of the lamps 46 for optimum illumination; moves the slide 120 to position the scale indicia 130 in the field of view; and initiates recording to capture the print as shown in FIG. 4. During periods of inactivity, the stand serves to park the imager in either the horizontal or vertical orientation, minimizing the chance of accidental damage.

Having thus described a presently preferred embodiment of the present invention, it will now be appreciated that the objects of the invention have been fully achieved, and it will be understood by those skilled in the art that many changes in construction and widely differing embodiments and applications of the invention will suggest themselves without departing from the sprit and scope of the present invention. The disclosures and description herein are intended to be illustrative and are not in any sense limiting of the invention, which is defined solely in accordance with the following claims.

What is claimed:

1. A stand assembly for a forensic imager, comprising: a stand having a top section and a pair of legs attached at upper ends to said top section and diverging laterally outwardly therefrom; foot members transversely attached at lower ends of said legs; means projecting downwardly from said foot members having engagement surfaces lying in a common plane; a support member attached to said top section and having laterally extending arms, said support member having a transverse hole for receiving means for attaching an ultraviolet imaging device including a lens assembly thereto wherein said imaging device includes a lens assembly, said support member further including locating means engaging said imaging device to locate the focal axis of said lens assembly normal to said engagement surfaces; lamp bracket members pivotally attached at inner ends to said arms for rotation about transverse axes parallel to said foot members; lamp members attached to outer ends of said bracket members and having an elongated ultraviolet lamp extending parallel to said foot members; a cylindrical slide bar attached to each of said foot members in laterally spaced relation normal to said engagement surfaces; a slide block member slidably supported on each slide bar; a scale plate connected to said slide block members; and a scale having linear indicia thereof connected to said scale plate and extending frontally therefrom in close proximity to said engagement surfaces to be effectively in the same focal plane thereof.

2. A visualization and recording apparatus for a forensic image on a evidentiary surface at an investigative scene, comprising: an imaging device including a lens assembly having a focal axis for focusing the images under ultraviolet illumination on a visual device in a scanning mode with a first field of view for identifying locations of the images at the scene and on a photographic device in a recording mode with a second field of view for documenting the image; a positioning device attached to said imaging device in said scanning mode and said recording mode, said positioning device having support means located beyond said first field of view and providing a base for engagement with the evidentiary surface; lamp units adjustably supported on said positioning device for providing and directing ultraviolet illumination on the image in said scanning mode and in said recording mode; a scale member having a linear scaled indicia carried on said positioning device and moveable from a first position outside said first field of view in said scanning mode and a second position inside said second field of view for recording with the image in said recording mode.

3. A visualization and recording apparatus as recited in claim 2 wherein positioning device includes a pair of legs outwardly diverging from a first end and terminating at a second end with transverse feet having surfaces lying in a plane normal to said focal axis for engaging the evidentiary surface.

4. A visualization and recording apparatus as recited in claim 2 including a pair of bracket members pivotally connected at inner ends to said first end of said positioning device and carrying said lamp units at outer ends.

5. A visualization and recording apparatus as recited in claim 4 wherein said bracket members are pivotally connected at controlled resistance pivotal connections permitting single handed adjustment thereof.

6. A visualization and recording apparatus as recited in claim 5 wherein said lamp units include an elongated ultraviolet lamp extending transversely parallel to said feet.

7. A visualization and recording apparatus as recited in claim 2 wherein said scale member is slidably supported at said feet for transverse sliding movement between said first position and said second position.

8. A visualization and recording apparatus as recited in claim 7 wherein scaled indicia is closely proximate said evidentiary surface whereby said indicia is located in the focal plane of the image in said recording mode.

9. A visualization and recording apparatus as recited in claim 8 wherein said scale member is slidably supported on a pair of transversely extending slide bars attached to said feet.

10. A visualization and recording apparatus as recited in claim 9 said slide bars are interconnected by a cross member for providing lateral reinforcement for said legs.

11. A visualization and recording apparatus as recited in claim 3 wherein said positioning member includes an upper support member having a transverse aperture and said imaging device includes a handle member having an end extending through said aperture and threaded to said imaging device for removable attachment thereto.

12. A visualization and recording apparatus as recited in claim 11 wherein said upper support member has a lateral locating surface that is engaged by a complementary surface on said imaging device for locating said focal axis normal to and at a fixed distance from said evidentiary surface in said documenting mode.

* * * * *